(12) United States Patent
Huang et al.

(10) Patent No.: US 12,149,813 B2
(45) Date of Patent: Nov. 19, 2024

(54) ELECTRONIC DEVICE INCLUDING DISPLAY MODULE AND CAMERA MODULE

(71) Applicant: VIVO MOBILE COMMUNICATION CO., LTD., Dongguan (CN)

(72) Inventors: Kai Huang, Dongguan (CN); Zongwen He, Dongguan (CN); Huasheng Zhu, Dongguan (CN); Panpan Zhu, Dongguan (CN); Shangming Yang, Dongguan (CN); Ling Hu, Dongguan (CN)

(73) Assignee: VIVO MOBILE COMMUNICATION CO., LTD., Dongguan (CN)

( * ) Notice: Subject to any disclaimer, the term of this patent is extended or adjusted under 35 U.S.C. 154(b) by 252 days.

(21) Appl. No.: 17/746,902

(22) Filed: May 17, 2022

(65) Prior Publication Data

US 2022/0279104 A1    Sep. 1, 2022

Related U.S. Application Data

(63) Continuation of application No. PCT/CN2020/128942, filed on Nov. 16, 2020.

(30) Foreign Application Priority Data

Nov. 18, 2019  (CN) .......................... 201911130035.6

(51) Int. Cl.
*H04N 23/57*   (2023.01)
*H04N 23/51*   (2023.01)

(52) U.S. Cl.
CPC ............. *H04N 23/57* (2023.01); *H04N 23/51* (2023.01)

(58) Field of Classification Search
None
See application file for complete search history.

(56) References Cited

U.S. PATENT DOCUMENTS 10,365,693 B2 *  7/2019  Sun .................... G06V 40/1365
11,968,438 B2 *  4/2024  Huang ................ G02B 5/3033
(Continued)

FOREIGN PATENT DOCUMENTS

CN    108900672 A    11/2018
CN    108957829 A    12/2018
(Continued)

OTHER PUBLICATIONS

International Search Report issued in corresponding International Application No. PCT/CN2020/128942, mailed Feb. 18, 2021, 6 pages.
(Continued)

*Primary Examiner* — Cynthia Segura
(74) *Attorney, Agent, or Firm* — IPX PLLC

(57) ABSTRACT

An electronic device is provided including a display module and a camera module. The display module includes a first substrate, a second substrate, and a routing structure. The first substrate and the second substrate are stacked. The routing structure is arranged on a surface of one side of the second substrate facing towards the first substrate and provided with a first light-passing hole. The camera module includes a camera body and a light-shielding layer. The camera body is provided with a light inlet hole. The second substrate is located between the first substrate and the camera body. The light-shielding layer is arranged on a surface of one side of the second substrate facing towards the camera body and provided with a second light-passing hole. The first light-passing hole, the second light-passing hole and the light inlet hole are arranged in an optical axis direction of the camera module.

9 Claims, 1 Drawing Sheet

(56) References Cited

U.S. PATENT DOCUMENTS

| | | | |
|---|---|---|---|
| 12,069,360 B2* | 8/2024 | Que | H04N 23/63 |
| 2019/0297279 A1* | 9/2019 | Wang | H04N 23/57 |
| 2021/0072588 A1* | 3/2021 | Tang | G02F 1/133608 |
| 2021/0109398 A1* | 4/2021 | Son | G02F 1/13312 |
| 2022/0163854 A1* | 5/2022 | Mochizuki | G03B 11/045 |

FOREIGN PATENT DOCUMENTS

| | | |
|---|---|---|
| CN | 110034151 A | 7/2019 |
| CN | 209233928 U | 8/2019 |
| CN | 110299072 A | 10/2019 |
| CN | 110426878 A | 11/2019 |
| CN | 110728905 A | 1/2020 |
| CN | 110784635 A | 2/2020 |
| CN | 110784636 A | 2/2020 |
| CN | 110827672 A | 2/2020 |
| JP | 2005116628 A | 4/2005 |
| WO | 2015034120 A1 | 3/2015 |

OTHER PUBLICATIONS

First Office Action issued in related Chinese Application No. 201911130035.6, mailed Jul. 28, 2020, 6 pages.

\* cited by examiner

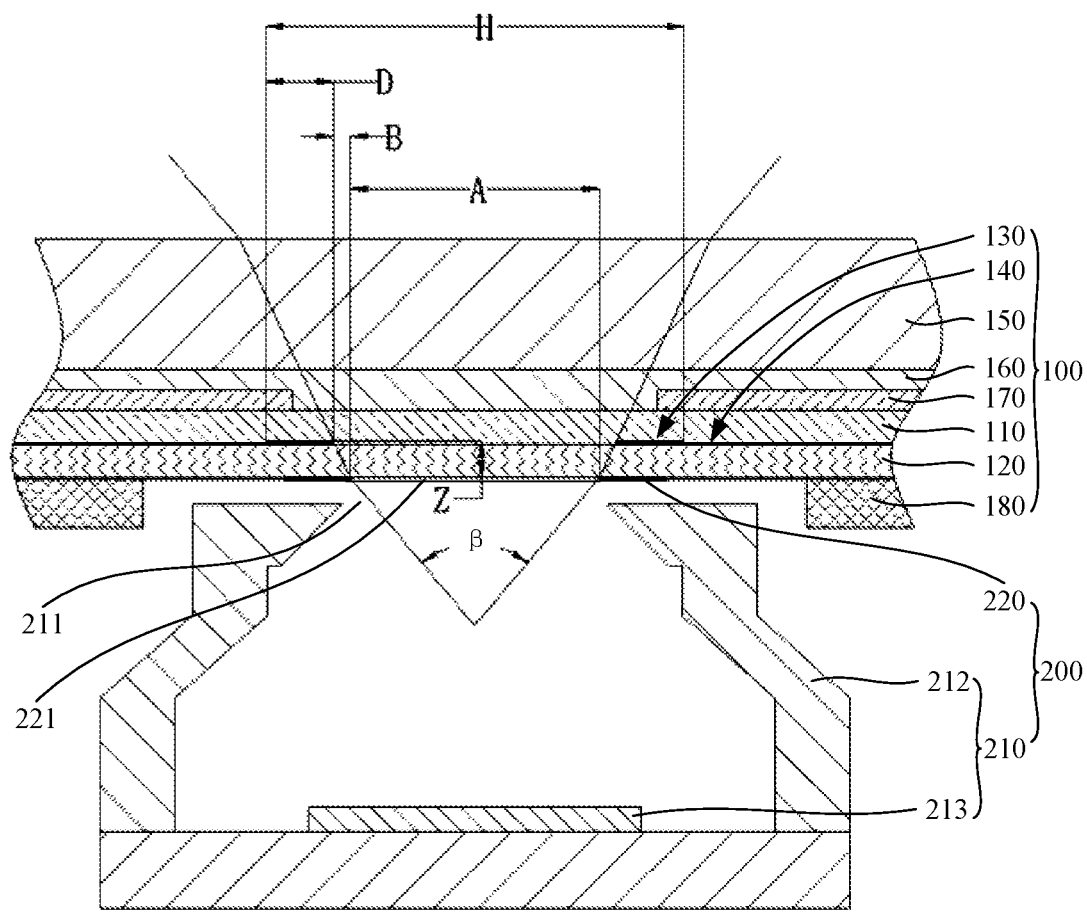

ELECTRONIC DEVICE INCLUDING DISPLAY MODULE AND CAMERA MODULE

CROSS-REFERENCE TO RELATED APPLICATIONS

This application is a continuation of International Application No. PCT/CN2020/128942, filed Nov. 16, 2020, which claims priority to Chinese Patent Application No. 201911130035.6 filed in China on Nov. 18, 2019. The entire contents of each of the above-referenced applications are expressly incorporated herein by reference.

TECHNICAL FIELD

The present disclosure relates to the technical field of communication devices, and in particular, to an electronic device.

BACKGROUND

Electronic devices such as a smart phone and a tablet computer have become indispensable products in people's life, and the screen-to-body ratio of the electronic devices is one of the important factors affecting user experience. Therefore, how to increase the screen-to-body of the electronic devices has become the design direction that the technicians in the art pay attention to.

In order to increase the screen-to-body ratio of existing electronic devices, the camera module can be arranged below the display module, and the display module is provided with a light-passing hole, so that it can be ensured that the camera module can work normally. The camera module mainly includes a bracket, a lens assembly, a light-shielding layer and other devices, wherein the lens assembly is mounted in the bracket, the light-shielding layer is mounted on the bracket, and the light-shielding layer is located above the lens assembly.

Due to a certain distance between the light-shielding layer and the display module, the light-passing hole formed in the display module needs to be larger than an inner diameter of the light-shielding layer. Meanwhile, due to an assembling error between the display module and the camera module, it is necessary to consider this assembling error and further enlarge the size of the light-passing hole when a hole is formed in the display module. Therefore, the light-passing hole formed in the existing display module is relatively large, resulting in relatively small screen-to-body ratio of the electronic device.

SUMMARY

The present disclosure discloses an electronic device.

To solve the foregoing problem, the present disclosure adopts the following technical solutions:

an electronic device includes:

a display module, wherein the display module includes a first substrate, a second substrate and a routing structure, the first substrate and the second substrate are stacked, the routing structure is arranged on a surface of one side of the second substrate facing towards the first substrate, and the routing structure is provided with a first light-passing hole; and a camera module, wherein the camera module includes a camera body and a light-shielding layer, the camera body is provided with a light inlet hole, the second substrate is located between the first substrate and the camera body, the light-shielding layer is arranged on a surface of one side of the second substrate facing towards the camera body, the light-shielding layer is provided with a second light-passing hole, the first light-passing hole, the second light-passing hole and the light inlet hole are arranged in an optical axis direction of the camera module, an orthographic projection of the second light-passing hole on a surface perpendicular to the optical axis direction falls within an orthographic projection of the light inlet hole on the surface perpendicular to the optical axis direction, and the orthographic projection of the second light-passing hole on the surface perpendicular to the optical axis direction falls within an orthographic projection of the first light-passing hole on the surface perpendicular to the optical axis direction.

BRIEF DESCRIPTION OF DRAWINGS

The accompanying drawings described herein are used to provide further understanding of the present disclosure and constitute a part of the present disclosure. The illustrative embodiments of the present disclosure and descriptions thereof are used to explain the present disclosure, and do not constitute any improper limitation on the present disclosure. In the accompanying drawings:

FIG. 1 is a section view of part of a structure of an electronic device according to an embodiment of the present disclosure.

DESCRIPTION OF REFERENCE NUMERALS

100—display module, 110—first substrate, 120—second substrate, 130—routing structure, 140—light-emitting portion, 150—light-transmitting cover plate, 160—optical adhesive, 170—polarizer, 180—foam, 200—camera module, 210—camera body, 211—light inlet hole, 212—bracket, 213—light-sensing chip, 220—light-shielding layer, 221—second light-passing hole.

DETAILED DESCRIPTION

To make the objectives, technical solutions and advantages of the present disclosure clearer, the following clearly describes the technical solutions of the present disclosure with reference to the specific embodiments of the present disclosure and the corresponding accompanying drawings. Apparently, the described embodiments are merely a part rather than all of the embodiments of the present disclosure. All other embodiments obtained by a person of ordinary skill in the art based on the embodiments of the present disclosure without creative efforts shall fall within the protection scope of the present disclosure.

The technical solutions disclosed by various embodiments of the present disclosure are described in detail below with reference to the accompanying drawings.

As shown in FIG. 1, an embodiment of the present disclosure provides an electronic device. The electronic device may specifically include a display module 100 and a camera module 200.

The display module 100 may specifically include a first substrate 110, a second substrate 120 and a routing structure 130, wherein the first substrate 110 and the second substrate 120 are stacked, and the routing structure 130 is arranged on a surface of one side of the second substrate 120 facing towards the first substrate 110. The first substrate 110 and the second substrate 120 may be glass plates, and a thin film transistor may be arranged on the second substrate 120. The routing structure 130 may be ring-shaped structure, the routing structure 130 is provided with a first light-passing hole, and the first light-passing hole enables light to pass through, so that light in the external environment can enter the camera module 200. The display module 100 may further include a light-emitting portion 140, a light-transmitting cover plate 150, an optical adhesive 160, a polarizer 170 and foam 180, wherein the light-emitting portion 140 may be arranged between the first substrate 110 and the second substrate 120, and the light-emitting portion 140 may be an organic light-emitting layer; the polarizer 170 may be arranged on a surface of one side of the first substrate 110 away from the second substrate 120; the light-transmitting cover plate 150 is located on one side of the first substrate 110 away from the second substrate 120, and the light-transmitting cover plate 150 may be connected to the polarizer 170 through the optical adhesive 160; the foam 180 may be arranged on one side of the second substrate 120 away from the first substrate 110, the foam 180 may adhere to the second substrate 120 and may be provided with an avoidance hole, and at least one part of the camera module 200 may be located in the avoidance hole, so that the influence on the normal work of the camera module 200 by stray light in the display module 100 is avoided; meanwhile, the space occupied by the camera module 200 can be reduced, so that the thickness of the electronic device can be reduced.

The camera module 200 may specifically include a camera body 210 and a light-shielding layer 220, wherein the camera body 210 is provided with a light inlet hole 211, the second substrate 120 is located between the first substrate 110 and the camera body 210, the light-shielding layer 220 is arranged on a surface of one side of the second substrate 120 facing towards the camera body 210, and the light-shielding layer 220 is provided with a second light-passing hole 221. The camera body 210 may specifically include a bracket 212, a lens assembly and a light-sensing chip 213, the lens assembly is arranged on the bracket 212, and the lens assembly may include a convex lens, a concave lens and other lenses, so that the light converging effect can be achieved; and the light-sensing chip 213 may be arranged in the bracket 212, the light-sensing chip 213 is provided with a light-sensing area for sensing light, and the light-sensing chip 213 may convert an optical signal into an electrical signal, so that corresponding image information is acquired. Here, the second light-passing hole 221 enables light to pass through, so that light in the external environment can enter the camera module 200 and arrive at the light-sensing area of the light-sensing chip 213, and a shooting function can be realized.

The routing structure 130 and the light-shielding layer 220 can play a role in shielding light, and the first light-passing hole, the second light-passing hole 221 and the light inlet hole 211 are arranged in the optical axis direction of the camera module 200, so light in the external environment can sequentially pass through the first light-passing hole and the second light-passing hole 221, and finally pass through the light inlet hole 211 to enter the camera module 200, and the camera module 200 can realize the shooting function. An orthographic projection of the second light-passing hole 221 on a surface perpendicular to the optical axis direction of the camera module 200 falls within an orthographic projection of the light inlet hole 211 on the surface perpendicular to the optical axis direction, and the orthographic projection of the second light-passing hole 221 on the surface perpendicular to the optical axis direction falls within an orthographic projection of the first light-passing hole on the surface perpendicular to the optical axis direction. That is, during observation in the optical axis direction of the camera module 200, an overall size of the first light-passing hole and an overall size of the light inlet hole 211 are greater than an overall size of the second light-passing hole 221. The size of the light inlet hole 211 is slightly large. Such arrangement does not affect the screen-to-body ratio of the display module 100 and can ensure that light in the external environment enters the camera module 200 as much as possible. The second light-passing hole 221 will affect the screen-to-body ratio of the display module 100; therefore, on the premise of meeting the shooting requirement of the camera module 200, the second light-passing hole 221 may be set as small as possible, thereby reducing the occupancy rate of the light-shielding layer 220 on the display area and increasing the screen-to-body ratio of the electronic device. The first light-passing hole is located above the second light-passing hole 221; therefore, the first light-passing hole is slightly larger than the second light-passing hole 221, so that more light can enter the second light-passing hole 221 through the first light-passing hole, and the shooting effect of the camera module 200 is ensured better.

In the electronic device, the light-shielding layer 220 of the camera module 200 is arranged on the display module 100. According to this design, on one hand, a distance between the light-shielding layer 220 and the display module 100 is nearly zero, so the first light-passing hole may be smaller; and on the other hand, there is no assembling error between the display module 100 and the light-shielding layer 220, so it is unnecessary to consider the assembling error when the first light-passing hole is formed, the size of the first light-passing hole may be further reduced, and the screen-to-body ratio of the electronic device is higher. Meanwhile, after the size of the first light-passing hole is reduced, the appearance texture of the electronic device is improved, and the user experience is improved accordingly.

Referring to FIG. 1, H=A+(B+D)*2, wherein H is the size of a hole on the appearance surface of the display module 100 which cannot be used for displaying, A is a hole diameter of the second light-passing hole 221, B is a hole diameter difference value between the first light-passing hole and the second light-passing hole 221, and D is a width of the routing structure 130. Since the field of view β of the camera module 200 is a fixed value, A is basically a fixed value; since the light-shielding layer 220 is arranged on the display module 100, a distance Z between the routing structure 130 and the light-shielding layer 220 is less than a distance between the routing structure 130 and the light-shielding layer 220 in the background art; meanwhile, the field of view β of the camera module 200 is also a fixed value, so according to the Pythagorean theorem, B is reduced compared with the background art, that is, a hole diameter of the first light-passing hole may be set smaller.

As mentioned above, the size of the first light-passing hole may be further reduced, and the specifically reduced amplitude may be flexibly selected according to the actual situation. In order to make the size of the first light-passing hole as small as possible without affecting light propagation, in an embodiment, in a section passing through the optical axis of the camera module 200, a distance S between a hole wall of the first light-passing hole and a hole wall of the second light-passing hole 221 in a direction perpendicular to the optical axis is equal to h*tan α, wherein h is a thickness of the second substrate 120, and α is a refraction angle when light passes through the second substrate 120. That is, the size of the first light-passing hole may just meet that light needing to enter the camera module 200 can be propagated to the second light-passing hole 221 through the first light-passing hole, which will not reduce the light entering the camera module 200 due to too small first light-passing hole and will not enlarge the hole on the appearance of the display module 100 that cannot be used for displaying due to too large first light-passing hole; therefore, this arrangement mode can meet the shooting requirement of the camera module 200 and also can further increase the screen-to-body ratio of the electronic device.

In the embodiment of the present disclosure, the outline shapes of the routing structure 130 and the light-shielding layer 220 may be arranged flexibly, for example, the outline shapes may be a rectangle, a circle and an ellipse; meanwhile, the shapes of the first light-passing hole and the second light-passing hole may be selected flexibly, for example, the first light-passing hole and the second light-passing hole may be a rectangular hole, a circular hole, an elliptic hole and the like. In an embodiment, considering that the shape of the field of view of the camera module 200 is usually circular, so in order to adapt to the camera module 200 to further increase the screen-to-body ratio of the electronic device, the routing structure 130 and the light-shielding layer 220 may be arranged in a ring-shaped structure. At this time, a radial width of the light-shielding layer 220 may be less than a radial width of the routing structure 130, so that too large light-shielding area caused by too large radial width of the light-shielding layer 220 can be avoided, and the above aim can be fulfilled.

Further, the orthographic projection of the light inlet hole 211 on the surface perpendicular to the above optical axis direction may fall within the orthographic projection of the first light-passing hole on the surface perpendicular to the optical axis direction, or the orthographic projection of the first light-passing hole on the surface perpendicular to the optical axis direction may fall within the orthographic projection of the light inlet hole 211 on the surface perpendicular to the above optical axis direction. Considering that light enters the light inlet hole 211 in a gradual convergence manner, when the orthographic projection of the light inlet hole 211 on the surface perpendicular to the above optical axis direction falls within the orthographic projection of the first light-passing hole on the surface perpendicular to the above optical axis direction, it can be ensured that sufficient light enters the camera module 200, and the size of the light inlet hole 211 can be reduced appropriately, so that the overall size of the camera module 200 is reduced accordingly, and this arrangement is more beneficial to stacking of parts in the electronic device.

In order to improve the shooting effect of the camera module 200, a distance between a focus of the camera body 210 and the light-shielding layer 220 in the above optical axis direction may be a preset value. That is, when the position of the light-shielding layer 220 changes, the position of the camera body 210 changes accordingly to ensure that the focus of the camera body 210 and the light-shielding layer 220 keep mutually matched positions, so that the shooting effect is improved. In the embodiment of the present disclosure, since the light-shielding layer 220 moves up into the display module 100, the distance between the camera body 210 and the display module 100 can be further reduced, and the display module 100 and the camera module 200 are distributed more compact, so that it is more beneficial to stacking of parts in the electronic device.

The forming manner of the light-shielding layer 220 has various implementation solutions. In an embodiment, the light-shielding layer 220 may be formed by a film-coating process. That is, the light-shielding layer 220 may be of a film-coating structure. This film-coating structure is convenient to form, and the thickness of the formed light-shielding layer 220 is smaller, so that it is more beneficial to control the thickness of the electronic device. Specifically, the shielding layer 220 is arranged on the surface of one side of the second substrate 120 facing towards the camera body 210, and it is necessary to arrange a thin film transistor and other structures on the surface of one side of the second substrate 120 away from the camera body 210 through an evaporation process; therefore, the light-shielding layer 220 may be coated after the evaporation process and the bonding process of the first substrate 110 and the second substrate 120 are performed, or the light-shielding layer 220 may be coated before the evaporation process and the bonding process of the first substrate 110 and the second substrate 120 are performed. When the previous implementation manner is adopted, it is necessary to correspondingly add a protection measure for preventing the first substrate 110 and the second substrate 120 from being scratched.

Certainly, the light-shielding layer 220 may also be of a printing structure. That is, the light-shielding layer 220 may be formed on the surface of one side of the second substrate 120 facing towards the camera body 210 through a printing process, and this manner has the advantages of convenience in implementation and small thickness of the formed light-shielding layer 220. Specifically, the light-shielding layer 220 may be printed after the evaporation process and the bonding process of the first substrate 110 and the second substrate 120 are performed, or the light-shielding layer 220 may be printed before the evaporation process and the bonding process of the first substrate 110 and the second substrate 120 are performed.

When the electronic device is assembled, the alignment and fixation between the light-shielding layer 220 and the camera body 210 can be realized through by means of accurately positioning a Charge-Coupled Device (CCD) camera and driving the camera module 200 by a micromotor to dynamically adjust alignment, so that the relative position of the light-shielding layer 220 and the camera body 210 has higher precision, the imaging effect of the camera module 200 is ensured, it is unnecessary to consider the alignment error and increase the size of the first light-passing hole, and the screen-to-body ratio of the electronic device can be increased.

The electronic device disclosed in the embodiments of the present disclosure may be a smart phone, a tablet computer, an e-book reader, or a wearable device. Certainly, the electronic device may also be other devices, which is not limited in the embodiments of the present disclosure.

The embodiments of the present disclosure focus on describing differences between the embodiments, and different optimization features of the embodiments may be combined to form better embodiments provided that they are not contradictory. Considering brevity, details are not described herein again.

The above is only embodiments of the present disclosure, and is not intended to limit the present disclosure. Various changes and modifications may be made to the present disclosure by those skilled in the art. Any modifications, equivalent substitutions, improvements and the like made within the spirit and principle of the present disclosure should be included within the scope of the claims of the present disclosure.

The invention claimed is:

1. An electronic device, comprising:
   a display module, wherein the display module comprises:
      a first substrate, a second substrate, and
a wire routing structure,
wherein:
the first substrate and the second substrate are stacked,
the wire routing structure is arranged on a surface of one side of the second substrate facing towards the first substrate, and
the wire routing structure is provided with a first light-passing hole; and
a camera module, wherein the camera module comprises:
a camera body and a light-shielding layer,
wherein:
the camera body is provided with a light inlet hole,
the second substrate is located between the first substrate and the camera body,
the light-shielding layer is arranged on a surface of one side of the second substrate facing towards the camera body, and
the light-shielding layer is provided with a second light-passing hole,
wherein:
the first light-passing hole, the second light-passing hole and the light inlet hole are arranged in an optical axis direction of the camera module,
an orthographic projection of the second light-passing hole on a surface perpendicular to the optical axis direction falls within an orthographic projection of the light inlet hole on the surface perpendicular to the optical axis direction, and
the orthographic projection of the second light-passing hole on the surface perpendicular to the optical axis direction falls within an orthographic projection of the first light-passing hole on the surface perpendicular to the optical axis direction.

2. The electronic device according to claim 1, wherein in a section passing through the optical axis, a distance S between a hole wall of the first light-passing hole and a hole wall of the second light-passing hole in a direction perpendicular to the optical axis is equal to $S=h*\tan \alpha$, wherein h is a thickness of the second substrate, and $\alpha$ is a refraction angle when light passes through the second substrate.

3. The electronic device according to claim 1, wherein the wire routing structure and the light-shielding layer have ring-shaped structures, and a radial width of the light-shielding layer is less than a radial width of the wire routing structure.

4. The electronic device according to claim 1, wherein the orthographic projection of the light inlet hole on the surface perpendicular to the optical axis direction falls within the orthographic projection of the first light-passing hole on the surface perpendicular to the optical axis direction.

5. The electronic device according to claim 1, wherein a distance between a focus of the camera body and the light-shielding layer in the optical axis direction is a preset value.

6. The electronic device according to claim 1, wherein the light-shielding layer has a film-coating structure.

7. The electronic device according to claim 1, wherein the light-shielding layer has a printing structure.

8. The electronic device according to claim 1, wherein:
a size of the orthographic projection of the second light-passing hole on the surface perpendicular to the optical axis direction is smaller than a size of the orthographic projection of the light inlet hole on the surface perpendicular to the optical axis direction; and
the size of the orthographic projection of the second light-passing hole on the surface perpendicular to the optical axis direction is also smaller than a size of the orthographic projection of the first light-passing hole on the surface perpendicular to the optical axis direction.

9. The electronic device according to claim 1, wherein the light-shielding layer is arranged between the second substrate and the camera body.

* * * * *